J. A. FLEMING.
PIPE COUPLING.
APPLICATION FILED OCT. 13, 1909.
954,177.
Patented Apr. 5, 1910.
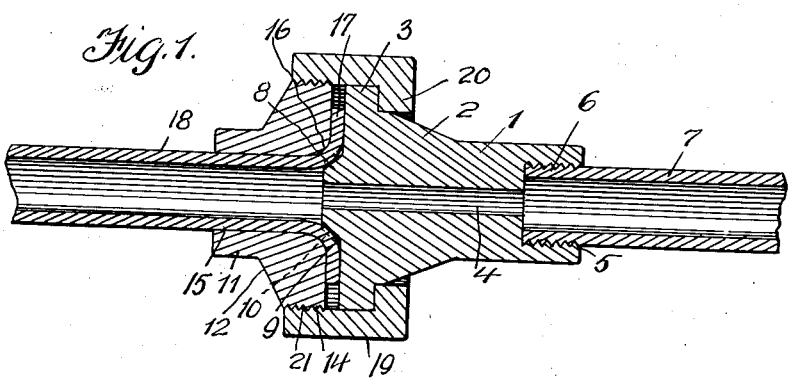
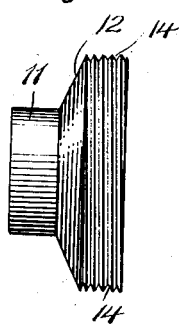  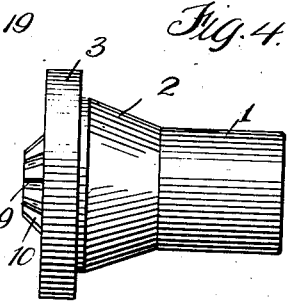
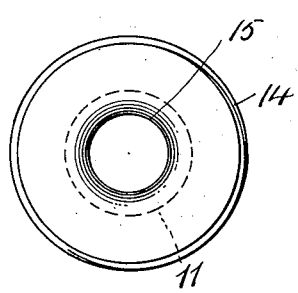 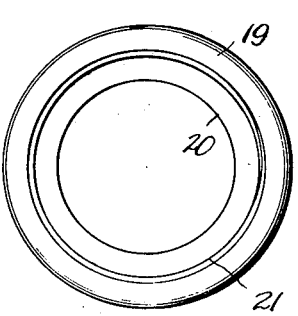 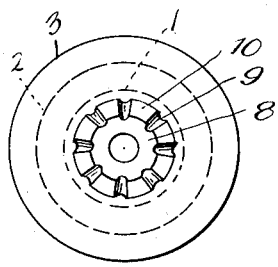
Witnesses:—
Samuel Payne
K. H. Butler
Inventor
J. A. Fleming.
by H. C. Evert & Co.
Attorneys.

UNITED STATES PATENT OFFICE.

JAMES A. FLEMING, OF PITTSBURG, PENNSYLVANIA.

PIPE-COUPLING.

954,177. Specification of Letters Patent. Patented Apr. 5, 1910.

Application filed October 13, 1909. Serial No. 522,433.

*To all whom it may concern:*

Be it known that I, JAMES A. FLEMING, a citizen of the United States of America, residing at Pittsburg, in the county of Allegheny and State of Pennsylvania, have invented certain new and useful Improvements in Pipe-Couplings, of which the following is a specification, reference being had therein to the accompanying drawing.

This invention relates to pipe couplings, and the objects of my invention are, first to provide positive and reliable means for connecting a lead pipe to a wrought iron pipe to obviate the necessity of using solder and other material for obtaining a water-tight connection. These and such other objects as may hereinafter appear are attained by the novel construction, combination and arrangements of parts to be hereinafter described and then claimed, and reference will now be had to the drawing forming a part of this specification, wherein there is illustrated a preferred embodiment of my invention, but I reserve the right to make such changes and variations as fall within the scope of the appended claim.

In the drawings:—Figure 1 is a longitudinal sectional view of a pipe coupling constructed in accordance with my invention. Fig. 2 is a side elevation of a lead pipe coupling member. Fig. 3 is a similar view of a coupler. Fig. 4 is a similar view of a wrought iron pipe coupling member. Fig. 5 is an end view of the lead pipe coupling member shown in Fig. 2. Fig. 6 is an end view of the coupler shown in Fig. 3, and Fig. 7 is an end view of the wrought iron pipe coupling member shown in Fig. 4.

As indicated by the drawing my pipe coupling comprises three elements adapted to connect the end of a wrought iron pipe to the end of a lead pipe.

The wrought iron pipe coupling member comprises a cylindrical body 1 having one end thereof flared or enlarged, as at 2, and terminating in a peripheral flange 3 of a greater diameter than the body 1. The body 1 is provided with a longitudinal bore 4 having one end thereof terminated in a socket 5, the inner walls of which are screw threaded to receive threaded ends 6 of a wrought iron pipe 7. The opposite end of the bore terminates in a conical-shaped enlargement 8 carried by the body 1 and projecting beyond the face of said body, the greatest diameter of said conical-shaped enlargement being less than the body 1, while the smallest diameter of said enlargement is greater than the diameter of the bore 4. The conical-shaped enlargement 8 is provided with radially disposed grooves 9 extending from face of the body 1 to the apex of the enlargement, these grooves providing equally spaced radially disposed teeth 10, the function of which will presently appear.

The lead pipe coupling member comprises a cylindrical body 11 having one end thereof flared or enlarged, as at 12, and exteriorly screw threaded, as at 14. The body 11 is provided with a longitudinal bore 15 extending from one end of said body to the other and having the edges of said bore bordering upon the face of the member 11 rounded, as at 16, to snugly fit the flanged or flared end 17 of a lead pipe 18 mounted in the bore 15. The pipe 18 has the end thereof flared sufficiently to bear against the face of the member 11 and extend in proximity to the threaded periphery of said member, thus giving the flared end of the pipe sufficient bearing against the face of the member 11 that it can be frictionally held in engagement with said bore, as will hereinafter appear.

The coupler comprises a cylindrical tubular body 19 of a greater diameter than either of the bodies 1 or 11. One end of the body 19 is provided with inwardly projecting annular flange 20 adapted to engage the rear side of the peripheral flange 3 of the body 1. The inner walls of the body 19 at the opposite end thereof are screw threaded, as at 21, to receive the screw threads 14 of the enlarged end of the body 11.

After the lead pipe coupling member has been placed upon the lead pipe and the end thereof flared, as shown in Fig. 1, and the wrought iron coupling member screwed upon the pipe 7, the parts are then ready to be assembled by the coupler, which is placed upon the wrought iron pipe coupling member prior to screwing said member upon the wrought iron pipe. After the wrought iron pipe coupling member has been brought into engagement with the flared or flanged end of the lead pipe, with the conical-shaped enlargement 8 extending into the end of the lead pipe, the coupler is screwed upon the lead pipe coupling member to draw the wrought iron pipe coupling member into engagement with the end of the lead pipe.

As this operation is performed, the teeth 10 of the conical-shaped enlargement 8 bite into and frictionally engage the flared end of the lead pipe, preventing the said pipe from rotating in its coupling member, besides making a positive connection between said pipe and the wrought iron pipe coupling member 1.

Having now described my invention, what I claim as new is:—

A pipe coupling comprising the combination with a pipe section 18 having a flared end and a pipe section 7 having a threaded end, of a pair of coupling members and a coupler for connecting said members together, one of said coupling members comprising a body-portion having one end thereof enlarged and formed with a peripheral flange, said body having a longitudinal bore terminating at one end in a threaded socket into which extends the threaded end of the pipe section 7, the other end of said bore terminating in an inwardly-extending truncated cone-shaped enlargement projecting from the inner face of said body and having the periphery thereof provided with radially-disposed teeth extending from the inner face of the body to the free terminus of said enlargement, the other of said coupling members comprising a body-portion mounted upon and inwardly of the flared end of the pipe section 18 and having one end thereof enlarged and exteriorly-threaded, the free terminus of said cone-shaped enlargement projecting into the flared end of the pipe section 18 and beyond the plane of the inner face of that coupling member mounted upon the pipe section 18, and said coupler comprising a cylindrical body-portion having one end thereof formed with an inwardly-extending annular flange adapted to engage said peripheral flange and said cylindrical body-portion further having interior threads adapted to engage the screw-threads of that coupling member mounted upon the pipe section 18 whereby said coupling members are connected together and the flared end of the pipe section 18 clamped between the opposing faces of the coupling members.

In testimony whereof I affix my signature in the presence of two witnesses.

JAMES A. FLEMING.

Witnesses:
A. H. RABSÁG,
K. H. BUTLER.